No. 701,498. Patented June 3, 1902.
J. E. NIGHTINGALE.
MACHINE FOR MEASURING THE AREAS OF SURFACES.
(Application filed Sept. 7, 1901.)
(No Model.) 2 Sheets—Sheet 1.
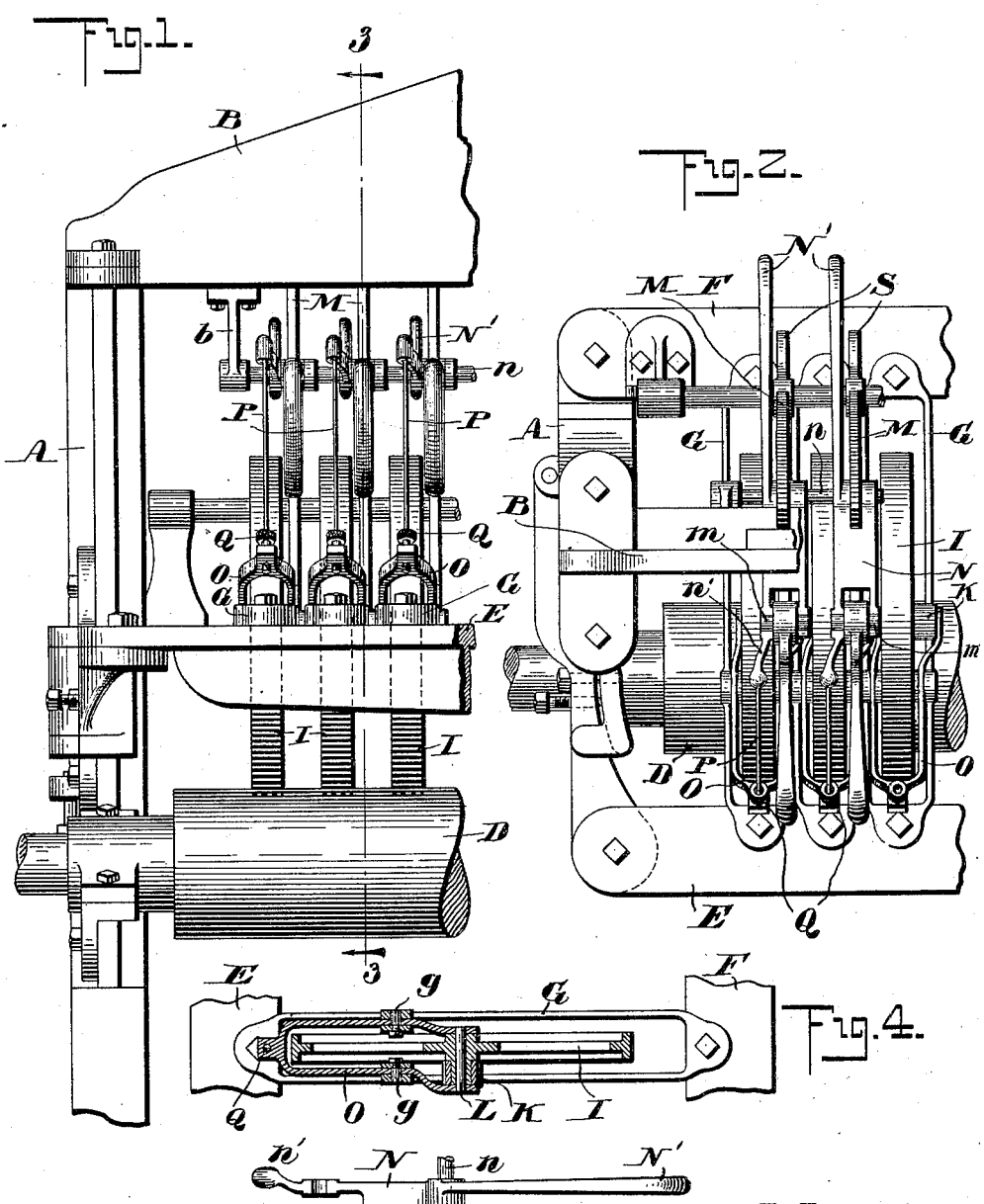
Witnesses:
Charles F. Logan
Sydney Harris
Inventor:
Josiah E. Nightingale

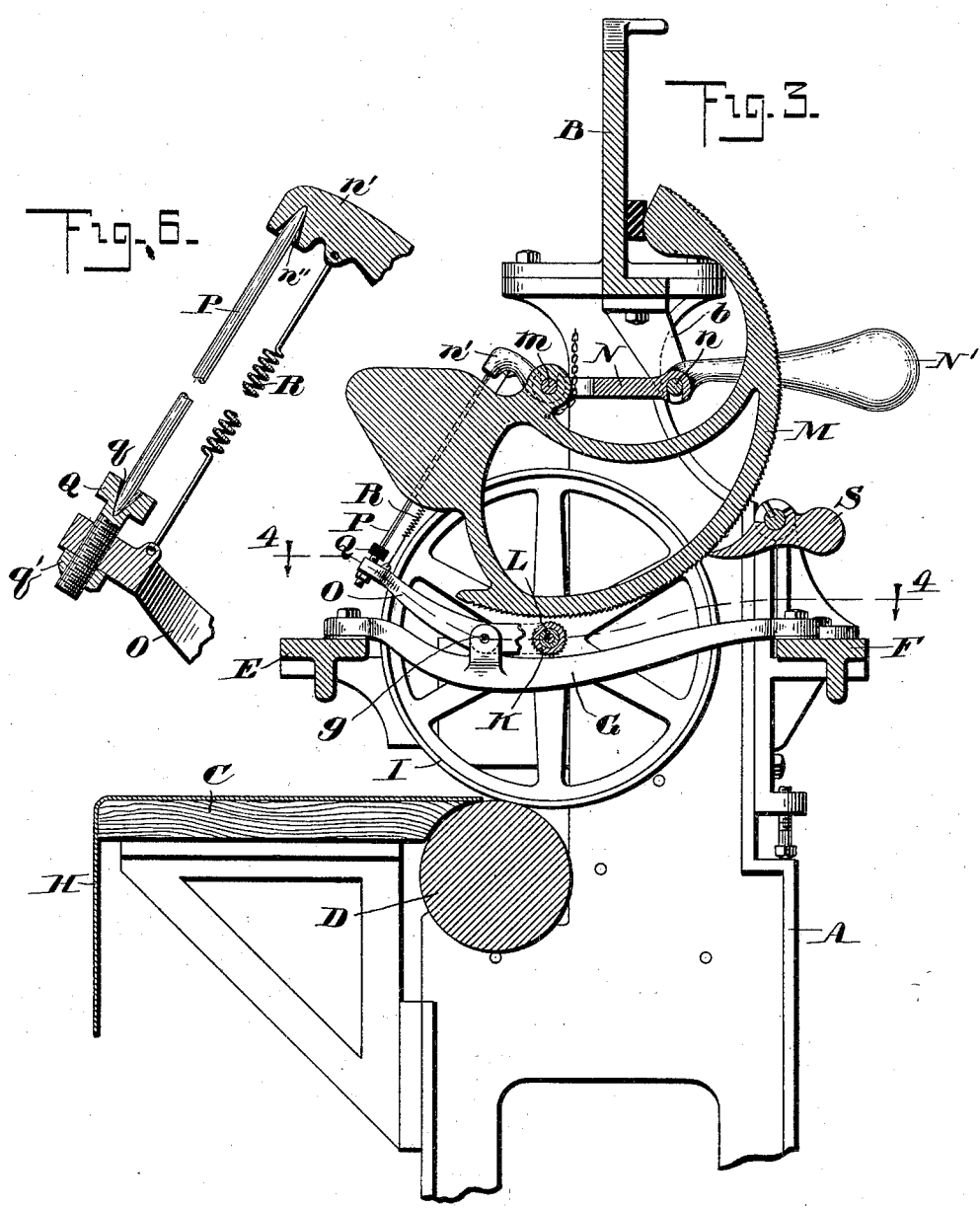

UNITED STATES PATENT OFFICE.

JOSIAH E. NIGHTINGALE, OF DANVERS, MASSACHUSETTS.

MACHINE FOR MEASURING THE AREAS OF SURFACES.

SPECIFICATION forming part of Letters Patent No. 701,498, dated June 3, 1902.

Application filed September 7, 1901. Serial No. 74,604. (No model.)

*To all whom it may concern:*

Be it known that I, JOSIAH E. NIGHTINGALE, a citizen of the United States, and a resident of Danvers, in the county of Essex and State of Massachusetts, have invented certain new and useful Improvements in Machines for Measuring the Areas of Surfaces, of which the following is a specification.

This invention relates to improvements on the patent granted to me September 4, 1900, No. 657,444, for machine for measuring areas of surfaces; and it consists in certain mechanism hereinafter to be more fully shown and described for automatically controlling the relative positions of the measuring-wheels and toothed segments according to the thickness of the hide or skin to be measured, reference being had to the accompanying drawings, wherein—

Figure 1 is a partial front elevation of a machine for measuring areas of surfaces embodying my improvements. Fig. 2 is a top plan view of Fig. 1. Fig. 3 is a vertical section on the line 3 3 shown in Fig. 1. Fig. 4 is a detail plan view of the stationary yoke, showing in section the measuring-wheel, its pinion, and the skeleton lever pivotally connected to said stationary yoke. Fig. 5 is a detail plan view of the upper lever, in which the toothed segment is hung; and Fig. 6 is a detail enlarged view showing the adjustable connection between the levers in which the respective measuring-wheel and segment are hung.

Similar letters refer to similar parts wherever they occur on the different parts of the drawings.

In the drawings, A represents one of the upright end frames, and B represents the upper beam, which serves as a support for the dial and indicating devices, as is common in machines of this kind.

C is the work-supporting table, D the feed-roller, and E and F the respective front and rear cross-bars, as usual.

G is a stationary skeleton yoke or bracket secured to the front and rear cross-bars E F, or either one of them, as may be most practical and convenient.

H, in Fig. 3, represents the hide or skin the area of which is to be measured.

I represents one of the measuring-wheels, normally supported on the feed-roller D, as usual in machines of this kind, said measuring-wheel having attached to one of its sides a small pinion K, secured to a spindle L, as usual.

M is one of the toothed segments, which during the measuring operation of the hide or skin engages with the corresponding pinion K on the measuring-wheels, and each such toothed segment is hung at *m* on a forked skeleton lever N, pivotally connected at *n* to a bracket *b* on the beam B, as shown.

N' is a weighted lever made integral with the lever N, and it extends toward the rear of the machine and serves as a partial counterbalance for the segment M.

The spindle L of the measuring-wheel and its pinion is journaled in a bearing in the inner ends of a skeleton lever O, which is pivotally connected at *g* to ears or projections on the stationary yoke or bracket G. Integral with the segment-supporting lever N is a projection *n'*, which is adjustably connected to the lower lever O, as shown in Figs. 3 and 6. In practice I prefer to construct such connecting device between the segment-supporting lever N and the measuring-wheel lever O as follows: In the under side of the lever extension *n'* I make, preferably, a tapering recess *n''*, adapted to receive the upper end of a rod P, the lower end of which is similarly received in a recess *q* in the upper end of a screw-threaded bolt Q, that is adjustably screwed in a screw-threaded perforation in the lower lever O, as shown, and provided, preferably, with a check-nut *q'*. (Shown in detail in Fig. 3.) By adjusting the position of the screw-threaded bolt Q relative to the lever O the distance between the latter and the projection *n'* on the lever N may be lengthened or shortened as may be desired to compensate for variations in the thicknesses of the hides or skins the surfaces of which are to be measured.

In practice I prefer to interpose between the ends of the lever O and projection *n'* on the lever N a yielding spring R, which serves the purpose of holding the rod P properly connected to the levers O N in case the hide or skin that is to be measured should vary in thickness during the measuring operation.

I wish to state that instead of using a rod

P, having ends supported in recesses in the ends of the lever N, and adjusting-screw Q, I may, if so desired, pivot the ends of such rod in any suitable manner to such parts without departing from the essence of my invention.

The operation is as follows: As the hide or skin H is passed between the feed-roller D and measuring-wheel I the latter and its pinion K are raised, causing the forward end of the lever O to move downward, thereby liberating the segment M, which will descend by gravity so as to intermesh with the ascending pinion K, thus causing the latter and the segment M to intermesh and their relative positions to be automatically controlled during the measuring of the hide or skin and to compensate for variations in the thickness of the latter. When the hide or skin has passed entirely between the feed-roller and measuring-wheel, the latter drops in contact with the former, and during such downward motion of the said measuring-wheel the forward end of the lever O is raised, causing the lever N and the segment M to be likewise raised sufficiently to cause the latter to be brought out of mesh with the pinion K and held in its measured position by the pawl S, as is usual in machines of this kind. It will thus be seen that the mechanism hereinabove described serves to automatically control the relative movements of the measuring-wheels and toothed segments—that is, as one rises the other descends, or vice versa—thus increasing the sensitiveness of the mechanism of the measuring device.

What I wish to secure by Letters Patent and claim is—

In a machine for measuring the areas of surfaces, a measuring-wheel I, having a toothed pinion K, journaled in a skeleton lever O, pivotally connected to a stationary skeleton yoke or bracket G, in combination with a toothed segment M, suspended on a pivoted lever N, having a forwardly-projecting extension $n'$, an adjusting-screw Q, arranged on the lever O, a rod P, loosely interposed between the parts $n'$ and Q, and a contractile spring R connecting the ends of the levers N and O, substantially as and for the purpose set forth.

In testimony whereof I have affixed my signature in presence of two witnesses.

JOSIAH E. NIGHTINGALE.

Witnesses:
  ALBAN ANDRÉN,
  HENRY MCCLEARN.